(12) United States Patent
Fox et al.

(10) Patent No.: US 8,644,758 B2
(45) Date of Patent: Feb. 4, 2014

(54) REPEATER SYSTEM

(75) Inventors: Andrew Fox, Wiltshire (GB); Piers Glydon, Bristol (GB); Paul Cosgrove, Bath (GB)

(73) Assignee: Deltenna Limited (GB)

( * ) Notice: Subject to any disclaimer, the term of this patent is extended or adjusted under 35 U.S.C. 154(b) by 310 days.

(21) Appl. No.: 13/055,491

(22) PCT Filed: Jul. 3, 2009

(86) PCT No.: PCT/GB2009/050788
§ 371 (c)(1),
(2), (4) Date: Apr. 14, 2011

(87) PCT Pub. No.: WO2010/010371
PCT Pub. Date: Jan. 28, 2010

(65) Prior Publication Data
US 2011/0189949 A1   Aug. 4, 2011

(30) Foreign Application Priority Data

Jul. 22, 2008 (GB) .................................. 0813442.1

(51) Int. Cl.
*H04B 7/15* (2006.01)

(52) U.S. Cl.
USPC .......................................... 455/11.1; 455/25

(58) Field of Classification Search
USPC ..................... 455/15, 16, 25, 135, 134, 150.1
See application file for complete search history.

(56) References Cited

U.S. PATENT DOCUMENTS

| | | |
|---|---|---|
| 5,570,354 A | 10/1996 | Simon |
| 6,934,511 B1 | 8/2005 | Lovinggood |
| 7,299,005 B1 | 11/2007 | Yarkosky |
| 2002/0045431 A1* | 4/2002 | Bongfeldt .................. 455/234.1 |
| 2005/0122931 A1 | 6/2005 | Kado |
| 2006/0063487 A1 | 3/2006 | Cleveland |
| 2006/0098592 A1 | 5/2006 | Proctor Jr. |

FOREIGN PATENT DOCUMENTS

| | | |
|---|---|---|
| GB | 2444538 A | 6/2008 |
| WO | 0148946 A1 | 7/2001 |
| WO | 0152447 A2 | 7/2001 |
| WO | 03058984 A2 | 7/2003 |
| WO | 2007004930 A1 | 1/2007 |
| WO | 2008058155 A2 | 5/2008 |

OTHER PUBLICATIONS

International Search Report PCT/GB2009/050788; Dated Jan. 22, 2010.

* cited by examiner

*Primary Examiner* — Tu X Nguyen
(74) *Attorney, Agent, or Firm* — Cantor Colburn LLP (57) ABSTRACT

The present invention provides a repeater system, comprising: first transceiver circuitry, for establishing communications with a base station of a cellular communications system; second transceiver circuitry, for establishing communications with a wireless device; and a single antenna system, comprising a plurality of antenna elements. Signals to and from the first transceiver circuitry and the second transceiver circuitry can each be received and transmitted through the single antenna system. The single antenna system includes beam definition circuitry, in which amplitudes of signals between the first transceiver circuitry and each antenna element, and between the second transceiver circuitry and each antenna element, can be adjusted independently, such that different beam patterns can be provided for the first transceiver circuitry and the second transceiver circuitry.

3 Claims, 5 Drawing Sheets

REPEATER SYSTEM

This invention relates to a repeater system, and in particular to a repeater system that can be used to extend the coverage of a cellular communications system.

Cellular communications systems include a number of base stations, each of which provides coverage for wireless devices within its coverage area, or cell, so that the system as a whole provides coverage for wireless devices within the network coverage area.

It is recognized that, particularly in certain frequency bands, this coverage can be problematic within buildings.

According to a first aspect of the present invention, there is provided a repeater system, comprising first transceiver circuitry, for establishing communications with a base station of a cellular communications system; second transceiver circuitry, for establishing communications with a wireless device; and a single antenna system, comprising a plurality of antenna elements. Signals to and from the first transceiver circuitry and the second transceiver circuitry can each be received and transmitted through the single antenna system. The single antenna system includes beam definition circuitry, in which amplitudes of signals between the first transceiver circuitry and each antenna element, and between the second transceiver circuitry and each antenna element, can be adjusted independently, such that different beam patterns can be provided for the first transceiver circuitry and the second transceiver circuitry.

According to a second aspect of the present invention, there is provided a method of installing a repeater system, wherein the system comprises first transceiver circuitry, for establishing communications with a base station of a cellular communications system, and second transceiver circuitry, for establishing communications with a wireless device. The method comprises selecting a first frequency for communication between the first transceiver circuitry and the base station of the cellular communications system; and then selecting a second frequency, different from the first frequency, for communication between the second transceiver circuitry and the wireless device.

According to a third aspect of the present invention, there is provided a method of installing a repeater system, wherein the system comprises first transceiver circuitry, for establishing communications with a base station of a cellular communications system, and second transceiver circuitry, for establishing communications with a wireless device. The method comprises, for each of a plurality of available system downlink frequencies, detecting a received signal parameter using each of a plurality of directional receive antenna beam shapes; and selecting for communication with the cellular communications system the receive antenna beam shape that causes the best detected signal parameter.

According to a fourth aspect of the present invention, there is provided a method of installing a repeater system, wherein the system comprises first transceiver circuitry, for establishing communications with a base station of a cellular communications system, and second transceiver circuitry, for establishing communications with a wireless device. The method comprises, for each of a plurality of available system downlink frequencies, detecting a received signal strength using each of a plurality of directional receive antenna beam shapes; and, for the receive antenna beam shape that causes the lowest detected received signal strength, determining whether a repeater system transmit power, which is scaled such that it causes an acceptable signal leakage, is below a threshold and selecting a frequency and a corresponding receive antenna beam shape that causes the lowest detected received signal strength, for which the repeater system transmit power, which is scaled such that it causes an acceptable signal leakage, is above said threshold.

Figure 1:
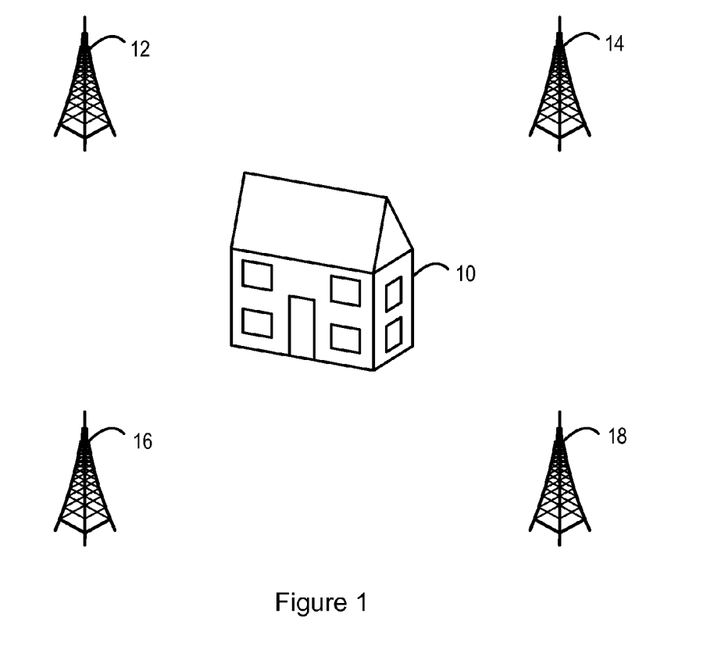
FIG. 1 is a schematic illustration showing the deployment of a repeater system in accordance with the present invention.

For a better understanding of the present invention, and to show how it may be put into effect, reference will now be made, by way of example, to the accompanying drawings, in which:

FIG. 1 illustrates a typical situation, in which the repeater system of the present invention may be used. Specifically, a user wishes to obtain a cellular service in a property 10, which is located in a position at which it could potentially detect signals from multiple base stations 12, 14, 16, 18 in the cellular communications network.

As is well known in cellular communications systems, the sizes of the coverage areas, or cells, served by the base stations are determined to a large extent by the power with which signals are transmitted by the base stations. While it is necessary that the base stations transmit their signals with sufficient power that they can be detected by mobile communications devices within the respective cells, it is disadvantageous for these transmission powers to be too large, as this increases the possibility that there will be interference. That is, interference would occur if a mobile device in one cell were able to detect signals transmitted from another cell using the same channel.

The system described above generally provides a good level of coverage for users of mobile communications devices. However, one issue concerns the availability of the service within buildings, which is where users increasingly wish to be able to use their mobile communications devices, and where signal strength can be a problem because signals can be attenuated by the building materials.

Figure 2:
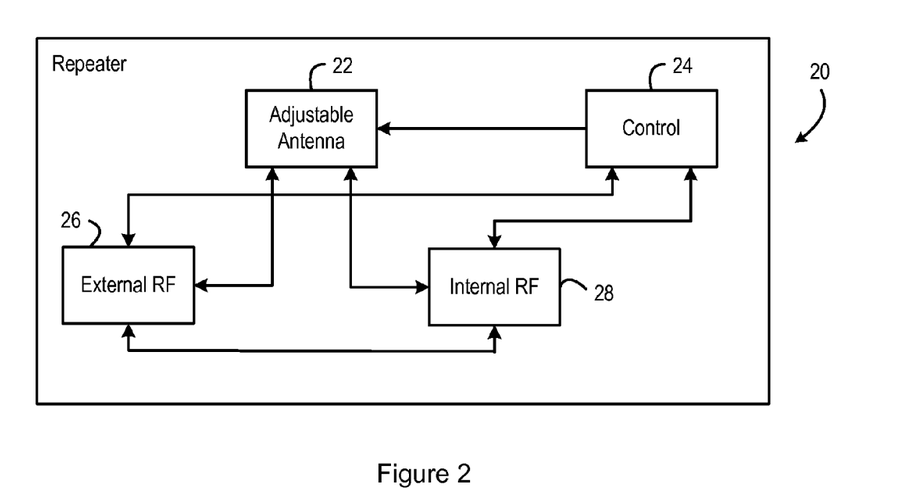
FIG. 2 is a block diagram, showing the repeater system in accordance with the present invention.

FIG. 2 therefore illustrates a repeater 20, which can be located in the property 10, and used to improve signal strength within the property 10 in order to improve coverage for users of mobile communications devices. The repeater can conveniently be powered by a local renewable energy source, such as a solar panel or wind turbine.

The repeater 20 includes an adjustable antenna device 22, which operates under the control of control circuitry 24, as described in more detail below. Radio frequency (RF) signals pass between the adjustable antenna device 22 and external RF circuitry 26 and internal RF circuitry 28, again as described in more detail below. The external RF circuitry 26 and the internal RF circuitry 28 each contain respective RF mixers, for downconverting RF signals to baseband and for upconverting baseband signals to RF.

Baseband signals can then be passed directly between the external RF circuitry 26 and the internal RF circuitry 28.

In addition, the control circuitry 24 is able to receive information from the external RF circuitry 26 and the internal RF circuitry 28, and is able to control aspects of the operation of the external RF circuitry 26 and the internal RF circuitry 28.

Thus, in general terms, signals can be received from one of the base stations of the cellular network and passed to the external RF circuitry 26, and then downconverted and passed to the internal RF circuitry 28, where they can be upconverted to RF, and than retransmitted within the property. Similarly, signals can be received from a mobile device within the property and passed to the internal RF circuitry 28, and then downconverted and passed to the external RF circuitry 26, where they can be upconverted to RF and then retransmitted within the property.

Figure 3:
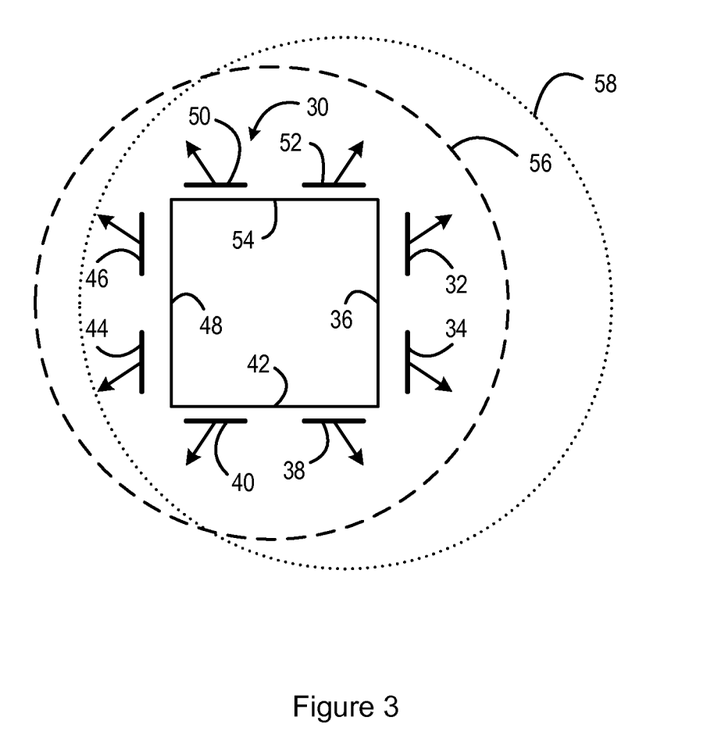
FIG. 3 shows in more detail a part of the repeater system of FIG. 2.

FIG. 3 is a schematic diagram, illustrating in more detail the form of the adjustable antenna device 22.

Specifically, in this illustrated embodiment of the invention, the adjustable antenna device 22 comprises a single antenna 30, which is shared by the external RF circuitry 26 and the internal RF circuitry 28. However, there are circumstances in which the adjustable antenna device may include two physical antenna devices. For example, the repeater 20 may be intended for use in a house, in which case it might conveniently be located in the attic or loft, above the living accommodation. In that case, there might be provided an external antenna with an adjustable horizontal beam pattern, and an internal antenna that primarily radiates downwards.

In the embodiment shown in FIG. 3, the single antenna 30 is formed from multiple directional antenna elements. In this illustrated embodiment, the antenna 30 is based on a rectangular unit, having two antenna elements 32, 34 on a first face 36 thereof, two antenna elements 38, 40 on a second face 42 thereof, two antenna elements 44, 46 on a third face 48 thereof, and two antenna elements 50, 52 on a fourth face 54 thereof. Although they are described here as antenna elements, it will be apparent to the person skilled in the art that each of these antenna elements can itself take the form of an array of individual antenna elements, if required, in order to provide desirable properties.

The antenna 30 thus has eight antenna elements in total. Each of these elements has a preferential direction of transmission and reception, indicated in FIG. 3 by the respective arrows extending outwards from the elements.

It can be seen that, when signals transmitted from these antenna elements have equal amplitudes, and when the antenna elements are equally sensitive to received signals, the antenna 30 is essentially omnidirectional. That is, the beam pattern, indicated by the dashed line 56, is generally circular. However, when signals transmitted from the antenna elements have unequal amplitudes, and when the antenna elements are not equally sensitive to received signals, the beam pattern changes. For example, the asymmetrical beam pattern indicated by the dotted line 58 is obtained when the signals transmitted from the antenna elements 32, 34 on the first face 36 have larger amplitudes than the signals transmitted from the antenna elements 44, 46 on the third face 48, and when the antenna elements 32, 34 on the first face 36 are more sensitive to received signals than the antenna elements 44, 46 on the third face 48.

Figure 4:
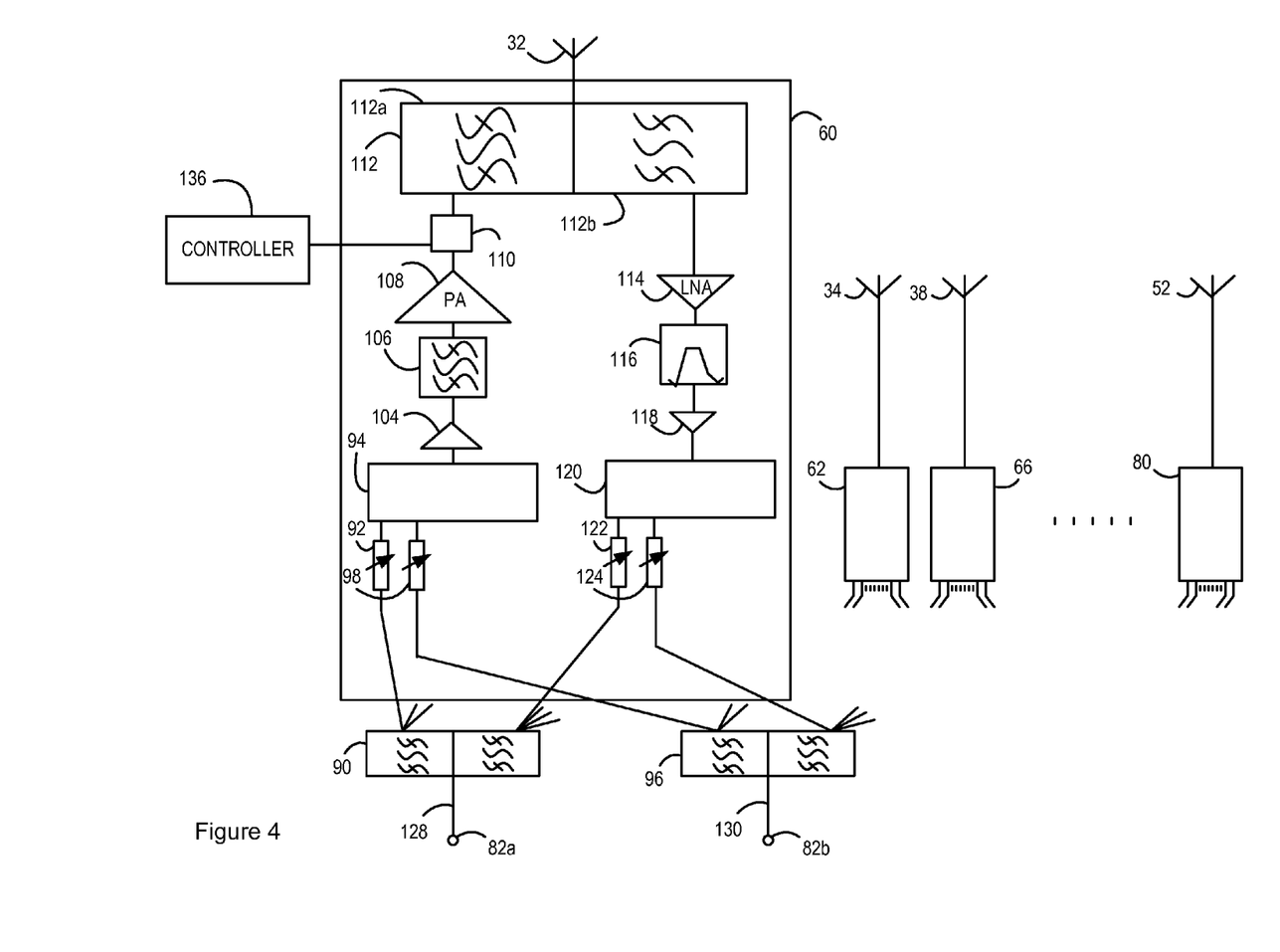
FIG. 4 shows in more detail a further part of the repeater system of FIG. 2.

The beam pattern is controlled by beam definition circuitry, and FIG. 4 illustrates the form of the beam direction circuitry that can be provided to allow independent control of the sizes and/or shapes of the respective areas served by the adjustable antenna device 22 for the external RF circuitry 26 and the internal RF circuitry 28, these areas also being referred to as the beam patterns.

Specifically, the beam definition circuitry includes first amplitude control circuitry 60 in a signal path connected to the first antenna element 32, second amplitude control circuitry 62 in a signal path connected to the second antenna element 34, third amplitude control circuitry 66 in a signal path connected to the third antenna element 38, and so on, up to eighth amplitude control circuitry 80 in a signal path connected to the eighth antenna element 52. Thus, in this embodiment, there is separate amplitude control circuitry in the signal path of each antenna element, although it will be appreciated that the same amplitude control circuitry may be located in the signal paths of more than one antenna element where this provides the required amount of beam definition.

It will be noted that a beam-forming network, such as a Butler matrix (not shown) may also advantageously be connected between the amplitude control circuitry blocks 60, 62, 66, . . . , 80 and the antenna elements 32, 34, 38, . . . , 52.

In accordance with this embodiment of the invention, there are separate internal and external user paths within the signal path for each antenna element.

Thus, the signals for transmission outside the property are applied from the external RF circuitry block 26 to a first connection point 82a, and then to a first user duplexer, or diplexer, 90. These transmit signals are then applied to a variable gain element, preferably in the form of a variable attenuator 92. The attenuated signals are applied to a high isolation combiner, preferably in the form of a Wilkinson structure 94.

At the same time, the signals for transmission inside the property are applied from the internal RF circuitry block 28 to a second connection point 82b, and then to a second user duplexer 96. These transmit signals are then applied to a variable gain element, preferably in the form of a variable attenuator 98. The attenuated signals are also applied to the high isolation combiner 94.

As discussed below, distinct beam patterns can be set for the signals to be transmitted externally and internally.

The combined signals output from the combiner 94 are applied to a driver amplifier 104, although this may be omitted in other embodiments of the invention, and then to a suitable band-pass filter 106, and then to a power amplifier 108. The amplified signals are passed through a switching element 110 to an input of a further duplexer 112. The output signal is then applied to the relevant antenna element 32.

In the case of signals received by the first antenna element 32, these received signals are passed to the duplexer 112, and the received signals are then applied to a low noise amplifier 114. The amplified signals are passed through a suitable band-pass filter 116 to an optional further amplifier 118, and then to a high isolation splitter, preferably in the form of a Wilkinson structure 120.

The illustrated structure can be used in the case of a frequency division duplex (FDD) system, where the duplexer 112 is used to provide isolation between the transmit and receive paths. However, any suitable mechanism can be used to provide the isolation between the transmit and receive paths. For example, in the case of a time division duplex (TDD) system, the isolation can be provided by means of a switch, which passes signals from the transmit path to the antenna, or from the antenna to the receive path, as required.

In one embodiment, the splitter simply passes a proportion of its input signal to each of its outputs, and these proportions may be equal. In another embodiment, the splitter can be frequency selective, in which case it can pass components of the received signal in different frequency bands to different outputs.

A first component of the signal is passed to a first variable attenuator 122, and a second component of the signal is passed to a second variable attenuator 124.

The signals from the first variable attenuator 122 are then passed to the receive side of the first operator user duplexer 90, and then to the connection point 82a for the external RF circuitry block 26; and the signals from the second variable attenuator 124 are then passed to the receive side of the second user duplexer 96, and then to the connection point 82*b* for the internal RF circuitry block 28.

Transmit signals from the external RF circuitry block 26, and receive signals for the external RF circuitry block 26 are preferably combined on a single cable 128. Similarly, transmit signals from the internal RF circuitry block 28, and receive signals for the internal RF circuitry block 28 are preferably combined on a single cable 130.

In normal use of the antenna system, the switch 110 passes the transmit signals from the power amplifier 108 to the transmit side 112*a* of the duplexer 112, which is therefore adapted to pass signals at the relevant transmit frequency. By contrast, the receive side 112*b* of the duplexer 112 is adapted to pass signals at the relevant receive frequency.

In a signal detection mode, the switch 110, which may for example take the form of a coupler or a circulator, passes received signals from the antenna element 32, which are at the relevant transmit frequency and therefore pass through the transmit side 112*a* of the duplexer 112, to a controller 136. The controller 136 shown in FIG. 4 may be associated with, or may be a part of, the controller 24 shown in FIG. 2.

The amplitude control circuitry blocks 62, 66, ..., 80 in the signal paths connected to the other antenna elements 34, 38, ..., 52 are substantially the same as the first amplitude control circuitry block 60 in the signal path connected to the first antenna element 32. Thus, the transmit sides of each of the user duplexers 90, 96, have respective connections into respective variable attenuators in the transmit paths of each of the amplitude circuitry blocks, while other variable attenuators in the receive paths of each of the amplitude circuitry blocks each have connections into the receive sides of each of the user duplexers 90, 96.

As discussed above, the amounts of attenuation in the transmit and receive signal paths for the antenna elements of an antenna system determine the beam shape for the antenna as a whole. As described here, the amounts of attenuation in the antenna element transmit and receive signal paths for the external RF signals (to and from the selected base station of the cellular network) can all be controlled independently such that they are different from the amounts of attenuation in the antenna element transmit and receive signal paths for the internal RF signals (intended to be received by and from mobile devices within the property 10). Thus, the external and internal users effectively see different beam shapes for the antenna as a whole.

Figure 5:
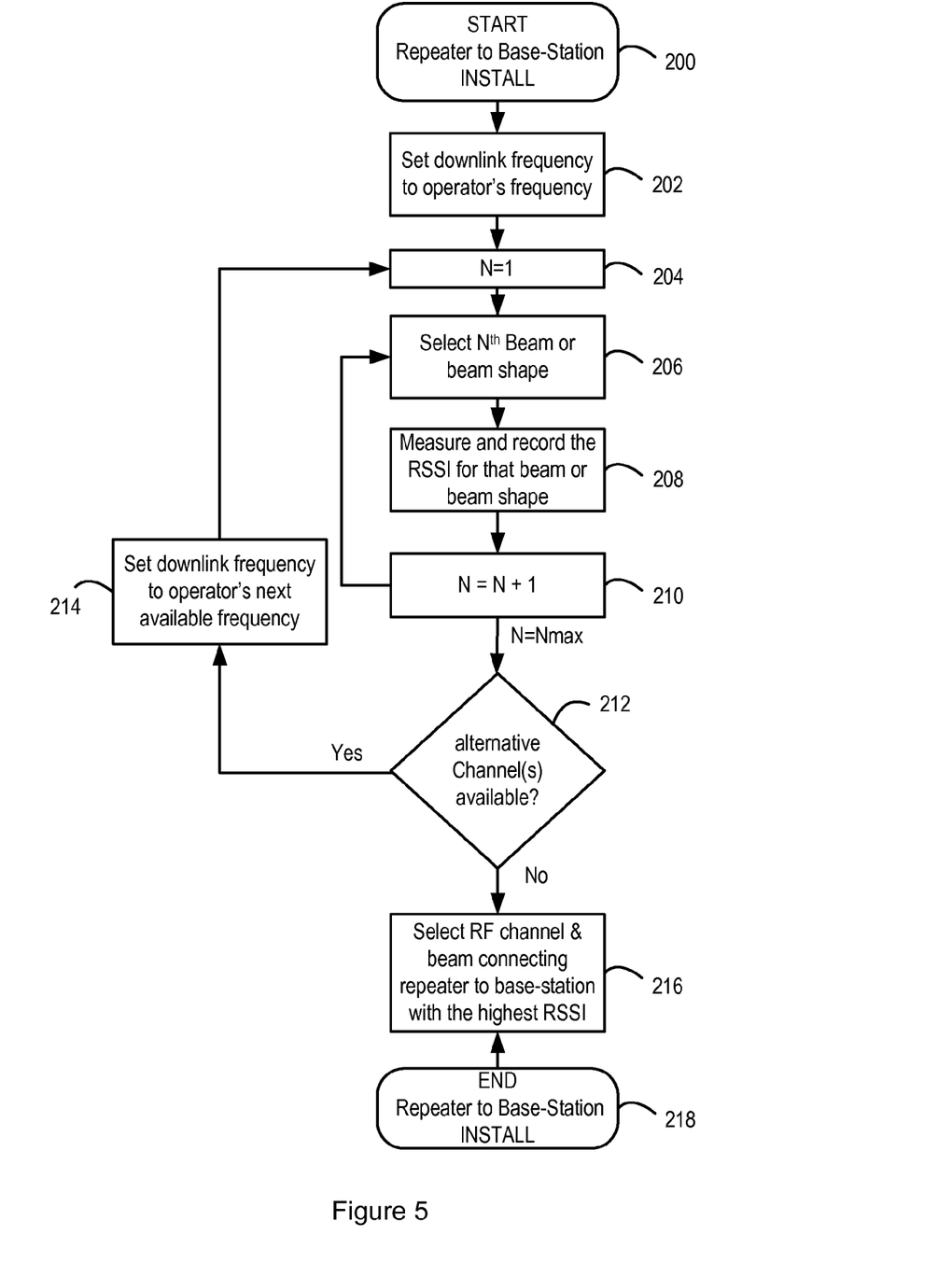
FIG. 5 is a flow chart, showing a first process in accordance with an aspect of the present invention.

FIG. 5 is a first flow chart, illustrating a first stage in the installation process performed by the repeater 20, this first stage relating to the link between the repeater 20 and a selected one of the base stations in the cellular network.

The process starts at step 200, and at step 202 the downlink transmission frequency that can be received by the external RF circuitry block 26 is set to one of the downlink frequencies in the relevant cellular network. This can conveniently be achieved by providing a bandpass filter that operates on the downconverted received signals, and therefore selects one of the frequencies used by that cellular network operator by selecting signals at the intermediate frequency corresponding to that RF frequency. The repeater 20 can be preprogrammed with a list of frequencies used by the relevant cellular network operator, to ensure that it only selects channels that are used by that operator.

In step 204, a counter N is set equal to 1, and in step 206 the system selects the Nth beam or beam shape on the antenna 30, as defined by the gain and attenuation elements in the receive paths between the eight antenna elements 32 etc and the external RF circuitry block 26. Thus, there may be a number of predetermined beam shapes, or beam patterns. For example, each of these predetermined beam shapes may be relatively directional, for example as may be achieved by having a relatively high gain/low attenuation in the receive path from only one or two of the antenna elements and relatively low gain/high attenuation in the receive path from the remaining antenna elements.

In step 208, the received signal strength (RSSI) for that beam or beam shape is measured and recorded.

In step 210, the value of N is increased by 1, unless N has already reached its maximum value, and the process returns to step 206.

When N has reached its maximum value, the process passes to step 212, in which it is determined whether another of the system downlink channels is available. As mentioned above, the repeater 20 can be programmed with the downlink frequencies that are used by the relevant network operator, so that it only tests channels of that operator. If one or more other downlink channels is available, the process passes to step 214, in which the downlink transmission frequency from the external RF circuitry block 26 is set to one of the other downlink frequencies in the relevant cellular network, and the process returns to step 204.

When it is eventually determined in step 212 that no further channels are available, the process passes to step 216, in which the combination of the RF channel and the beam or beam shape having the highest RSSI is selected. The repeater 20 is thus able to select for the external link the beam pattern that allows it to establish the strongest available signal from and to one of the nearby base stations. Moreover, using a beam pattern that may for example be relatively strongly directional, means that the risk of interference is minimized. Then, in step 218, this phase of the installation process ends. The repeater 20 also selects the frequency used by this same base station, so that it receives only signals on this frequency.

As described above, the repeater 20 selects a beam or beam pattern that establishes a connection to a base station which can provide the strongest available signal. In other situations, the signal strength may be of less relevance than the rate at which data can be transmitted over the link to the base station. For example, where a nearby base station is in a high load condition, it may be unable to offer a high data rate to a new data connection, even though it can establish a strong signal for voice traffic. In such situations, the repeater 20 can be provided with a device to measure the data throughput that can be achieved on each of the frequencies and using each of the beams, and can select the combination that can achieve the highest data rate.

A similar process can be performed after installation, so that the beam, or beam pattern, can be changed if a higher data rate can be achieved using a different combination of beam pattern and frequency.

Figure 6:
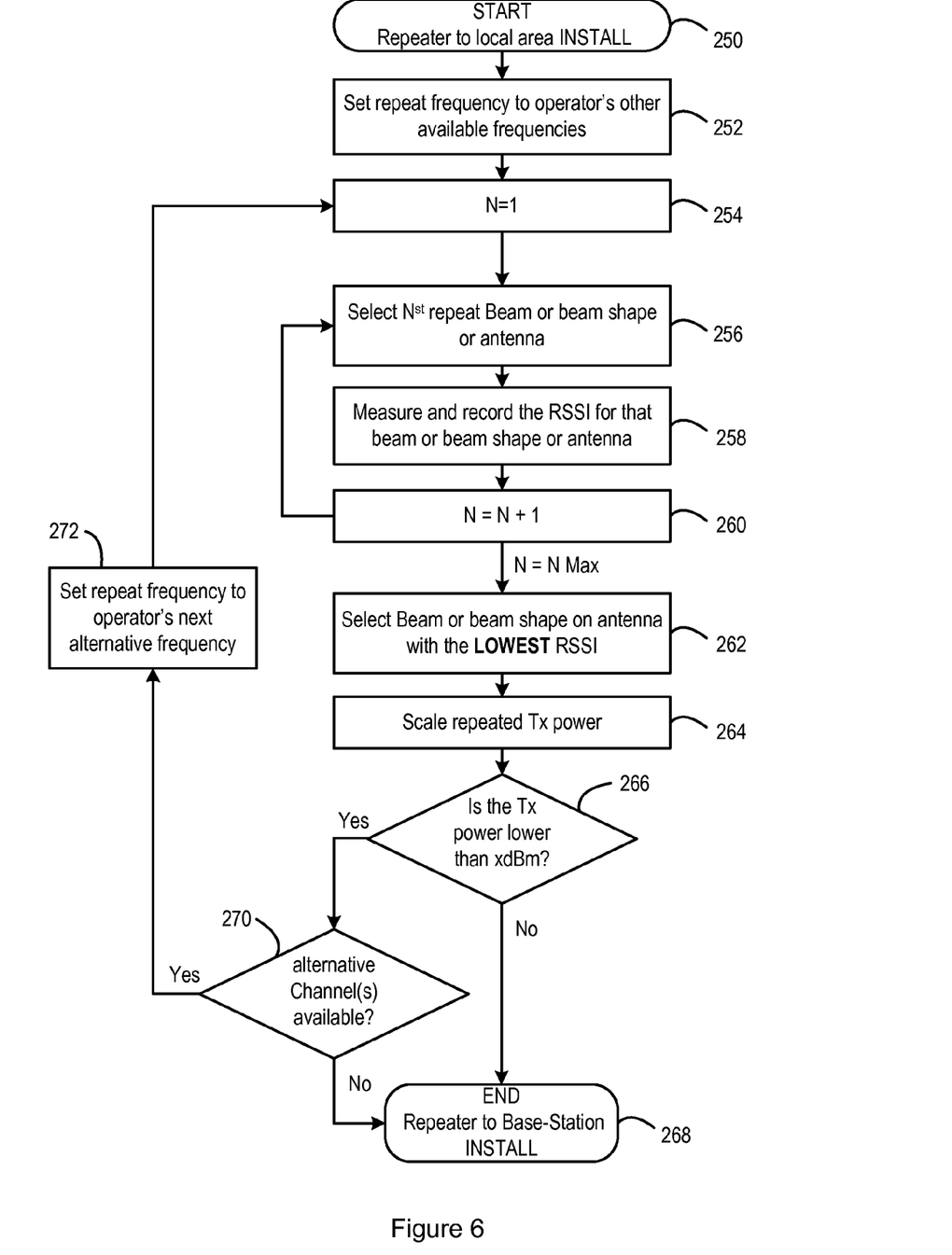
FIG. 6 is a flow chart, showing a second process in accordance with an aspect of the present invention.

FIG. 6 is a second flow chart, illustrating a second stage in the installation process performed by the repeater 20, this second stage relating to the link between the repeater 20 and the local area, for example within the property, in which one or more mobile subscribers may be located when the device is in use.

The process starts at step 250, and at step 252 the downlink transmission frequency from the internal RF circuitry block 28 is set to one of the downlink frequencies in the relevant cellular network. Specifically, in this embodiment of the invention, one of the available frequencies different from the frequency selected in the process of FIG. 4 is selected in step 252. This has the advantage that there is no risk of interference between the signals transmitted and received by the repeater. If the repeated signals are transmitted on the same frequency on which they are received, they cannot be retransmitted with high gain, as there will be a risk that they will be detected by the external RF antenna, causing oscillation. In one embodiment of the invention, this problem is avoided by using sufficiently directional antennas for the external and internal links that the repeated signal cannot be detected by the external RF antenna. However, as mentioned above, in this embodiment of the invention, the problem is avoided by selecting one of the available frequencies different from the frequency selected in the process of FIG. 4.

In step 254, a counter N is set equal to 1, and in step 256 the system selects the Nth beam or beam shape. As mentioned above, the internal RF circuitry block 28 may be connected to the same antenna as the external RF circuitry block 26. However, the internal RF circuitry block may alternatively or additionally be connected to a different antenna, for example an antenna having one or more beams having a significant vertical component, so that the device can conveniently be located above or below the space into which it is repeating the signals. Where this applies, the system can select in turn the beams or beam shapes provided by each of the antennas. As described below, the system eventually operates using a beam shape that is selected on the basis of its effect on the rest of the cellular network. It is therefore preferred in this embodiment of the invention that the available beam patterns should not be highly directional.

The selection of the beam or beam shape of the antenna 30, as described above, is achieved by the gain and attenuation elements in the receive paths between the eight antenna elements 32 etc and the internal RF circuitry block 26. As before, there may be a number of predetermined beam shapes, or beam patterns. For example, each of these predetermined beam shapes may be relatively directional, for example as may be achieved by having a relatively high gain/low attenuation in the receive path from only one or two of the antenna elements and relatively low gain/high attenuation in the receive path from the remaining antenna elements.

In step 258, the received signal strength (RSSI) for that beam or beam shape or antenna is measured and recorded.

In step 260, the value of N is increased by 1, unless N has already reached its maximum value, and the process returns to step 256.

When N has reached its maximum value, the process passes to step 262, in which the beam or beam shape or antenna producing the lowest received signal strength (RSSI) for that channel is selected. The process then passes to step 264, in which the repeater transmit power is scaled, so that the signal leakage from the local area to other deployed base stations is at a level that has been agreed by the mobile network operator. As the links are symmetrical, the signal leakage from the local area to other deployed base stations is determined by measuring at the repeater 20 the strengths of the signals transmitted by other deployed base stations. The scaling is then performed according to an algorithm set by the network operator. For example, the network operator may set a requirement that the sum of the repeater transmit power and the strength of the signal detected by the repeater must not exceed a particular threshold value. However, a more complex algorithm can be provided for setting the repeater transmit power.

In step 266, the transmit power resulting from the scaling process of step 264 is compared with a threshold power× dBm. If this transmit power is not lower than the threshold, the process passes to step 268, and this stage of the installation process is completed.

Where the scaling algorithm used in step 264 simply sets an upper limit for the sum of the repeater transmit power and the strength of the signal detected by the repeater, the comparison performed in step 266 effectively tests whether the signal strength received by the repeater is below a particular threshold value.

If it is found in step 266 that the transmit power is lower than the threshold, the process passes to step 270, in which it is determined whether another of the system downlink channels is available. If so, the process passes to step 272, in which the downlink transmission frequency from the internal RF circuitry block 28 is set to one of the other available downlink frequencies in the relevant cellular network, and then returns to step 254.

If instead it is determined in step 270 that no other channel is available, the process passes to step 268, and the system selects the combination of frequency and beam shape that can be transmitted with the highest power while still meeting the requirements on avoiding signal leakage, and this stage of the installation process is completed.

Thus, in this embodiment of the invention, the repeater selects the first channel/beam shape it finds where it can transmit above a threshold power using that beam shape, and where that beam shape receives the lowest interference of any available beam shape on that channel.

In other embodiments of the invention, the repeater can test all of the available combinations of frequency (including or excluding the frequency selected for the link with the base station, as desired) and beam shape, and can then select the combination that can be transmitted with the highest power while still meeting the requirements on avoiding signal leakage.

Although there is described here a process in which a frequency and beam shape are selected for the link to the base station, and then a frequency and beam shape are selected for the internal link, these selection steps can be performed in the opposite order.

The wireless device therefore establishes a connection to the base station of the cellular network, but uses a different uplink/downlink frequency pair from that used by the base station. In order to prevent this from causing problems, then, in situations where it is known that such repeaters are deployed, the base station can transmit messages instructing wireless devices not to restrict their transmissions to the channels on which the base station transmits and receives. In situations where it is known that such repeaters are deployed, and the frequencies that the repeaters use for their internal links are also known, the base station can transmit messages identifying the frequencies on which it transmits and receives and also identifying the frequencies on which the repeaters transmit and receive for their internal links.

There is thus disclosed a repeater that can allow establishment of improved links between a wireless device and a base station, without causing interference with other base stations.

The invention claimed is:

1. A method of installing a repeater system, wherein the system comprises first transceiver circuitry, for establishing communications with a base station of a cellular communications system, and second transceiver circuitry, for establishing communications with a wireless device; the method comprising: for each of a plurality of available system downlink frequencies: detecting a received signal strength using each of a plurality of directional receive antenna beam shapes; for the receive antenna beam shape that causes the lowest detected received signal strength: determining whether a repeater system transmit power, which is scaled such that it causes an acceptable signal leakage, is below a threshold; and selecting a frequency and a corresponding receive antenna beam shape that causes the lowest detected received signal strength, for which the repeater system transmit power, which is scaled such that it causes an acceptable signal leakage, is above said threshold.

2. A method as claimed in claim 1, comprising: testing each combination of frequency and receive antenna beam shape, and selecting the first tested frequency and the corresponding receive antenna beam shape that causes the lowest detected received signal strength, for which the repeater system transmit power, which is scaled such that it causes an acceptable signal leakage, is above said threshold.

3. A method as claimed in claim 1, comprising: testing every combination of frequency and receive antenna beam shape, and selecting the frequency and the corresponding receive antenna beam shape that causes the lowest detected received signal strength, which produces the highest repeater system transmit power, which is scaled such that it causes an acceptable signal leakage.

\* \* \* \* \*